United States Patent
Koloc

[11] 3,922,554
[45] Nov. 25, 1975

[54] SENSITIZED VIDEO PHOSPHOR MOTION PERCEPTION DISPLAY

[75] Inventor: Paul M. Koloc, College Park, Md.

[73] Assignee: The United States of America as represented by the Secretary of the Navy, Washington, D.C.

[22] Filed: May 28, 1974

[21] Appl. No.: 473,457

[52] U.S. Cl. ............................ 250/461; 250/330
[51] Int. Cl.² ............................................. H01J 31/50
[58] Field of Search ......... 250/330, 458, 459, 460, 250/461, 332, 333

[56] References Cited
UNITED STATES PATENTS

| | | | |
|---|---|---|---|
| 3,327,120 | 6/1967 | Weiss | 250/461 |
| 3,536,917 | 10/1970 | Desvignes | 250/330 |
| 3,764,807 | 10/1973 | Pollack | 250/330 |
| 3,832,558 | 8/1974 | Fern et al. | 250/461 |

*Primary Examiner*—Archie R. Borchelt
*Attorney, Agent, or Firm*—R. S. Sciascia; J. A. Cooke; W. W. Cochran

[57] ABSTRACT

A moving target indicator for illuminating only those objects in motion. The invention consists of a phosphorous excitation source such as a defocused electron beam or ultraviolet light synchronized with a focused near phosphorescent frequency (0.2 to 6 micron) laser for producing a photo effect raster. By modulating the laser with image information, only the time changing intensities (moving objects) produce a visible phosphorescent image since only changing photo effect image patterns produce visible images.

5 Claims, 4 Drawing Figures

SENSITIZED VIDEO PHOSPHOR MOTION PERCEPTION DISPLAY

BACKGROUND OF THE INVENTION

The present invention pertains generally to radio wave communications and more specifically to systems for distinguishing moving objects. Enhancement of moving targets is normally carried out by expensive electronic processing of time sequential signals used to form a display. These prior systems have used electronic processing involving memory elements and complex coupling techniques. The most common movement distinguishing system is the radar moving target indicator (MTI) which includes electronic cancelling circuits for eliminating successive radar pulses having the same phase.

Conventional canceller circuits include at least one canceller stage. A canceller stage has a signal input terminal and a subtractor circuit which provides a cancelled output. A first input terminal of the subtractor circuit is directly coupled to the signal input terminal, and a delay line is coupled between the signal input terminal and a second input of the subtractor circuit. The delay period of the delay line must be equal to the time between successive pulses. Thus, if echo pulses are received from a stationary target, the successive reflected pulses cancel each other and a zero output is provided.

Since the canceller stage has only one delay line, the output has only a first order cancellation. The order of cancellation may be increased by cascading a plurality of canceller stages to provide a significant improvement in rejection of signals returned from a stationary background other than the target, commonly known as clutter.

This requires the use of at least another delay line, which may present several disadvantages. In both typical surveillance and typical airborne attack radar, analog delay lines are quite expensive, costing several thousands of dollars. Also, in airborne attack radar, both size and weight of a radar system are critical considerations, and the use of a plurality of delay lines increases both the size and the weight of the system.

Electronic disadvantages are also present. Where a plurality of delay lines are utilized in analog embodiments, complicated circuitry must be utilized to regulate the delay periods of both delay lines to assure that they both produce the same delay time. Further, the possibility of differing temperature stability of the delay lines may lead to different delay periods and hence lead to inaccuracy in the output signal. Thus, it is extremely desirable to provide a higher order of cancellation than that which is produced by a conventional canceller stage while not relying on the complex, bulky, expensive and unreliable apparatus of the conventional system.

A system disclosed in application Ser. No. 399,029 for a Video Phosphor Motion Perception Display by Paul M. Koloc overcomes many of the disadvantages of the prior art. The display consists of a defocused electron beam or ultraviolet light used as an excitation source. Synchronized with this source is a focused $CO_2$ or similar laser which produces a thermal raster. Since only changing thermal patterns produce contrasting images on the screen, by modulating the laser with image information, only the time changing images (moving objects) are visible. The disadvanatage of this system however is that an extensive amount of power is needed to thermalize the phosphors with the $CO_2$ laser. In addition, modulators for use with frequencies of the $CO_2$ laser are extremely expensive.

SUMMARY OF THE INVENTION

The present device overcomes the disadvantages and limitations of the prior art by providing a sensitized video phosphor motion perception display. The display consists of a phosphorus excitation source such as an ultraviolet light and a raster scanned photo effect source such as a helium neon laser which is modulated by image information. Photons are absorbed by a phosphorescent frequency so as to produce a change in phosphorescent state, and thereby illuminate only those images in motion.

It is therefore the object of the present invention to provide an improved system for displaying moving objects.

It is also the object of the present invention to provide an inexpensive system for displaying moving objects.

Another object of the invention is to provide a simple convenient and compact device for displaying moving objects.

Another object of the invention is to provide a reliable system for displaying moving objects.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
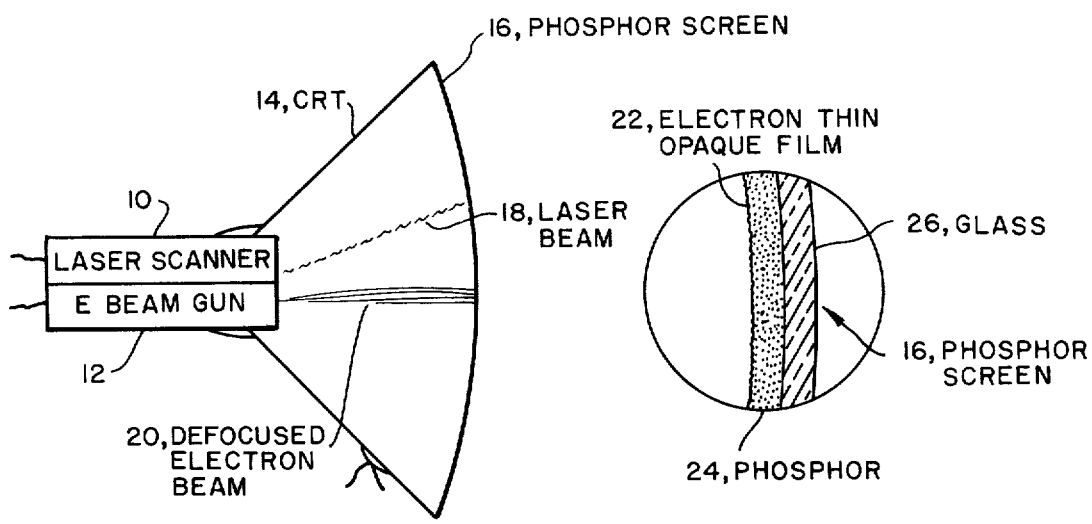
FIG. 1 shows the preferred embodiment of the present invention using an electron beam as an excitation source.

FIG. 1 is a diagram of a phosphor moving target indicator using an electron beam excitation source. Phosphors 24 are initially excited by a rapidly scanning defocused electron beam 20 produced by an electron beam gun 12. Laser scanner 10 produces a focused laser beam 18 which forms a thermal raster on the phosphor screen 16. A thermal picture is in turn produced by synchronizing the laser raster to conform with the raster of the electron beam and modulating the laser beam with image information normally impressed on the scanning electron beam 20. However, if the image information is repeated, i.e., if the picture contains no areas with time changing intensities, the thermal image will not produce a visible phosphorescent image except for the initial transient. Yet, if an object moves through the camera field, the phosphor screen will contain a changing thermal image pattern corresponding to the motion of the object. This is due to the population state of the phosphors as explained below.

If a phosphor is continuously activated by a source such as a low intensity ultraviolet lamp or a defocused electron beam, population trapping increases until the rates of decay equal the rate of excitation. In general, the relaxation time of a phosphor depends on temperature. For example, suppose a phosphor has an ambient temperature of $t_1$ and is excited under the conditions outlined above. When the phosphor reach equilibrium, its population $N_1$ is stored in the excited state. If the temperature of the phosphor is raised to $t_2$, the relaxation time of the phosphor will decrease. Consequently, with a constant excitation $C$, the population of the excited state will decrease to $N_2$.

The excitation rate $C$ approximately equals the quotient of the population and the relaxation time $\tau$ after equilibrium.

$$C \approx N_1/\tau_1 \approx N_2/\tau_2$$

The energy contained in the phosphor $E_2$ at temperature $t_2$ will be proportionally less than $E_1$. During the transient time, as the phosphor is heating, it will emit both the equilibrium radiation and the stored energy difference between thermal states (1) and (2). This will momentarily produce a more intense glow on an area of the phosphor screen heated to $t_2$ than on the surrounding area $t_1$. After equilibrium is reached, the phosphor's light intensity $I$ will be nearly identical.

$$I(\text{transient}) = C + E_1 - E_2/(\text{Heating Time})$$

By reversing the process and allowing the phosphor to cool from $t_2$ to $t_1$, the radiation emitted during the transient will be the remainder of the equilibrium intensity less the energy difference between thermal states 1 and 2. Thus the glow intensity $I$ from the area of the phosphor screen being cooled will decrease temporarily.

$$I(\text{transient}) = C - (E_1 - E_2) \text{ (cooling time)}.$$

This phenomenon may be utilized to produce a display device which has significant military application. As presently conceived, the device would be compatible with any image sensing device such as radar, infrared viewing systems, or television type systems.

In the conventional cathode ray display mode the total image is displayed. In the display mode we are considering, only objects in motion would be seen on the screen. This is the "motion perception" mode or MP mode.

In the conventional television display, stationary objects such as buildings, parked automobiles, stress, etc., have as much or more contrast than objects in motion such as people, moving cars, or birds in flight. In the MP display mode, stationary objects are suppressed. Only those objects in motion have contrast.

For perimeter defense, this device would be useful from the human factor standpoint. The system could eliminate much of the mental fatigue and human error associated with discriminating between moving stationary objects. This is especially true when the terrain is cluttered with debris, jungle, rocks, or a congestion of man-made objects.

By using laser sources having a frequency just below the devices phosphorescing frequency, the phosphors need not be thermalized to a great extent to achieve the same effect as is more clearly disclosed with reference to FIGS. 3 and 4.

Figure 3:
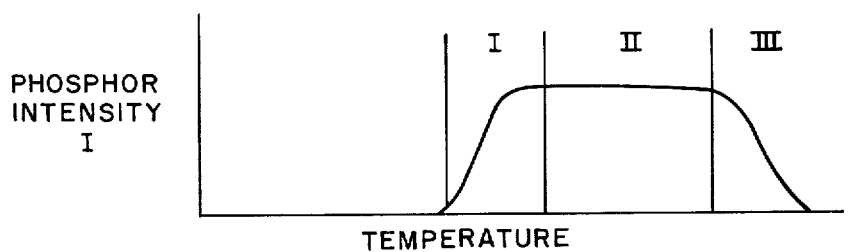
FIG. 3 is a plot of phosphor intensity versus temperature to show the effect of phosphor thermalization.

FIG. 3 shows a plot of phosphorescent intensity versus temperature. For temperatures below those found in Region I, no phosphorescence occurs. In Region I, a small change in temperature produces a significant variation in phosphorescent intensity, such that positive thermal pictures can be made using temperatures in the range of Region I.

Region II represents a range of temperatures where the phosphor's intensity varies slightly or not at all with a change in temperature. Region III, like Region I, produces a change intensity for a change in temperature. However, the thermal image produced by temperatures in this region are negative; that is, warmer parts of the phosphor are less intense. This is due to competition from non-radiative decay processes which become the dominant relaxation mode in Region III.

Figure 4:
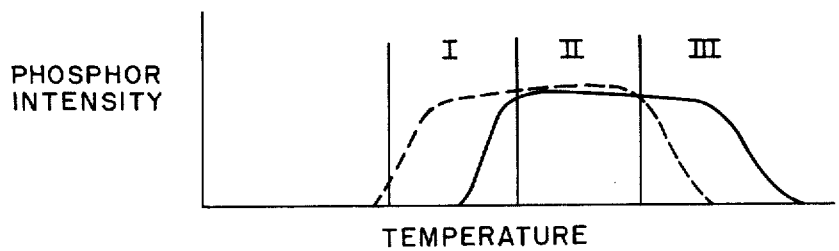
FIG. 4 is also a plot of phosphor intensity versus temperature to show the effect of phosphor sensitization.

FIG. 4 illustrates the change in the phosphor's emitting intensity with temperature to a radiation source having a wavelength slightly longer than the emitted phosphorescent radiation. As shown by the dashed line in FIG. 4, the phosphors become more sensitive to lower temperature rises when subjected to this radiation. As a result, less thermalization is required to cause changes in lumenescence of the phosphors in this "sensitized" state. Typical radiation sources for producing light of a wavelength slightly larger than the emitted phosphorescent radiation are helium-neon or gallium arsenide lasers having wavelengths ranging from 0.6 to 2 microns. Suitable modulators for these devices are much less expensive than, e.g., a $CO_2$ laser, operating in the far infrared region.

Figure 2:
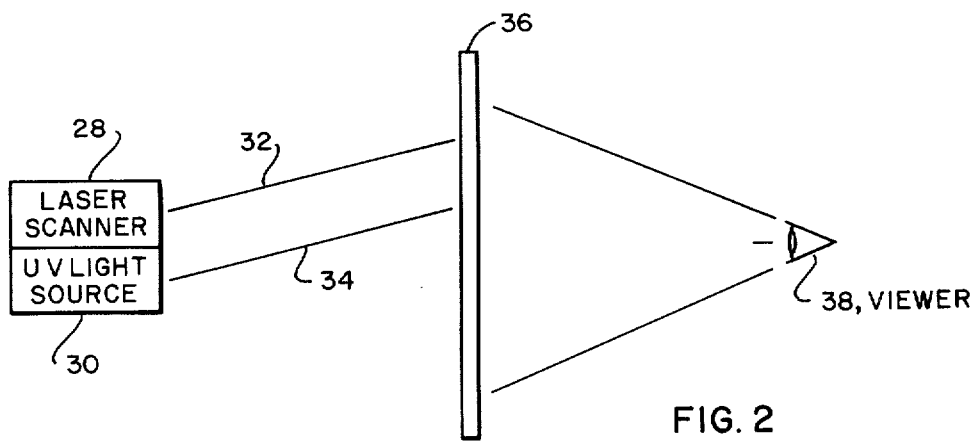
FIG. 2 shows the preferred embodiment using an ultraviolet light as an excitation source.

An alternative structure for displaying the MP mode is shown in FIG. 2. This device uses an ultraviolet light source to produce the required constant phosphor stimulation rate. Again, the picture is supplied by the laser. A vacuum tube is not needed since the electron beam is not being used. In addition, the size and shape of the screen could be adapted for different applications.

Thus, by utilizing a radiation source having a wavelength slightly longer than the visible light emitted by the phosphors, many of the disadvantages and limitations of the prior devices are eliminated.

Obviously many modifications and variations of the present invention are possible in light of the above teachings. For example, by suitable arrangement the device of FIG. 1 could operate in either the conventional or MP mode. For conventional mode, the laser beam is off or blank while the electron beam is modulated with image information and focused as a conventional television picture tube. This reduces the need for two separate screens without loss of utility.

Other applications may be possible. Certain information processing techniques utilize optical transforms, and it may be that motion in the transform could be of interest. Images of jumping laser modes become very discernable, due to the suppression of static mode images. It is therefore to be understood that within the scope of the appended claims the invention may be practiced otherwise than as specifically described.

What is claimed as new and desired to be secured by Letters Patent of the United States is:

1. A method of displaying moving objects in a stationary scene on a phosphorous screen comprising the steps of:

exciting said phosphorous screen at a constant excitation rate;

modulating a photo effect scanning source having a frequency ranging from 0.6 to 2 microns with image information of said scene;

projecting said photo effect source on said phosphorous screen to impress a image of said scene on said phosphorous screen to cause varying photo effect states and thereby varying energy intensities on phosphors corresponding to moving objects causing said screen to emit a visible image of only said moving objects.

2. A device for displaying both a stationary and moving object in a scene under a first mode of operation and only moving objects in said scene under a second mode of operation comprising:
- a phosphorous layer deposited on a glass plate to form a phosphorous screen;
- means for producing a focussed electron beam in said first mode of operation and a defocussed electron beam in said second mode of operation which is scanned across said phosphorous screen; and,
- means for producing a photo effect source which is modulated with image information and scanned synchronously with said means for producing a defocussed electron beam, said means for producing a photo effect source being activated only during said second mode of operation for producing a photo effect raster representative of said scene on said phosphorous screen such that the photo effect state of said phosphorous screen is continually changing for moving objects in said scene causing said screen to emit an image of only said moving objects.

3. A device for displaying only moving objects in a scene comprising:
- a phosphorous layer deposited on a glass plate to form a phosphorous screen;
- ultraviolet source means for stimulating said phosphorous screen at a constant excitation rate;
- means for producing a photo effect source which is modulated with image information and scanned across said phosphorous screen to impress a photo effect image of said scene on said phosphorous screen such that the photo effect state of said phosphorous screen is continually changing for moving objects in said scene causing said screen to emit a visible image of only said moving objects.

4. The device of claim 2 wherein said means for producing a photo effect source comprises a helium neon laser.

5. The device of claim 2 wherein said means for producing a photo effect source comprises a gallium-arsenide laser.

* * * * *